(12) United States Patent
Brummett

(10) Patent No.: US 7,384,573 B2
(45) Date of Patent: Jun. 10, 2008

(54) COMPOSITIONS FOR WASTEWATER TREATMENT

(76) Inventor: Ken Brummett, 8765 E. 102nd St., Tulsa, OK (US) 74133

( * ) Notice: Subject to any disclaimer, the term of this patent is extended or adjusted under 35 U.S.C. 154(b) by 185 days.

(21) Appl. No.: 11/107,776

(22) Filed: Apr. 18, 2005

(65) Prior Publication Data

US 2006/0231499 A1    Oct. 19, 2006

(51) Int. Cl.
*C02F 1/54* (2006.01)
(52) U.S. Cl. .................. 252/181; 210/716; 210/728; 210/730; 210/906; 252/175
(58) Field of Classification Search .............. 210/716
See application file for complete search history.

(56) References Cited

U.S. PATENT DOCUMENTS

| | | | |
|---|---|---|---|
| 5,128,040 A | 7/1992 | Molof et al. | |
| 5,156,746 A * | 10/1992 | Maree et al. | 210/712 |
| 5,204,452 A | 4/1993 | Dingilian et al. | |
| 5,282,977 A * | 2/1994 | Schinkitz | 210/724 |
| 5,362,717 A | 11/1994 | Dingilian et al. | |
| 5,543,056 A * | 8/1996 | Murcott et al. | 210/705 |
| 6,099,814 A * | 8/2000 | Langelin et al. | 423/161 |
| 6,113,788 A | 9/2000 | Molof et al. | |
| 6,180,023 B1 | 1/2001 | Amer | |
| 6,207,059 B1 | 3/2001 | Moore, III | |
| 6,217,768 B1 | 4/2001 | Hansen et al. | |
| 6,312,604 B1 * | 11/2001 | Denkewicz, Jr. et al. | 210/728 |
| 6,573,336 B1 | 6/2003 | Inagaki et al. | |
| 6,652,871 B1 * | 11/2003 | King et al. | 424/407 |
| 6,727,219 B2 * | 4/2004 | Buckland et al. | 510/439 |
| 6,733,662 B2 | 5/2004 | Pollock | |
| 6,893,567 B1 * | 5/2005 | Vanotti et al. | 210/605 |
| 7,157,009 B2 * | 1/2007 | Nichols et al. | 210/721 |

\* cited by examiner

*Primary Examiner*—Peter A. Hruskoci
(74) *Attorney, Agent, or Firm*—Crowell & Moring LLP

(57) ABSTRACT

Methods and compositions for wastewater treatment. The compositions comprise $CaCO_3$, $MgCO_3$, lanthanum chloride, or chitosan, and can be applied easily with conventional wastewater treatment processes and equipments. The methods and compositions of the present invention significantly improve treatment efficiency and reduce amount of required chemical additives.

10 Claims, No Drawings

COMPOSITIONS FOR WASTEWATER TREATMENT

FIELD OF THE INVENTION

The present invention relates to wastewater treatment and more particularly to compositions and methods for effective reduction of biological and chemical pollutants in the wastewater, such as reducing solids, phosphor salts, nitrogen, pathogens, heavy metals, and biological and chemical oxygen demands.

BACKGROUND OF THE INVENTION

Wastewater treatment entails removing and treating many different types of pollutants or contaminants found in wastewater. Various processes are known and available in the art, but the basic approaches revolve around biological and/or chemical treatment processes. Generally, solid components in the wastewater are removed via mechanical separation, for instance with the aid of screens and grit chambers and by allowing the solid impurities to settle in a preliminary settling device. This is followed by a chemical treatment process and preferably also by a biological treatment process.

Chemical treatment generally involves the use of precipitation chemicals, such as iron salts or aluminum salts, which react with, flocculate, and/or precipitate impurities in the wastewater such as phosphates.

Flocculation, or coagulation, plays a central role in this process, where dissolved and colloid impurities are destabilized and large floc aggregate are formed, which can be removed from the water in subsequent clarification or filtration process. The speed of flocculation and the quality of the floc aggregates formed is central to the effectiveness of the treatment process, not only because it affects the removal of the soluble or colloid impurities from the water, it also affects the characteristics (e.g. sludge quantity, volume, compactness and water content) of the sludge formed, which must also be treated.

The chemicals or flocculation agents commonly used for municipal wastewater treatment include alum and lime as well as a range of synthetic polymers. It is important to add the minimum amount of chemicals possible and to obtain good contact with all of the wastewater to reduce costs, maximize efficiency and minimize the amount of sludge.

In the biological treatment process, which can take place, for instance, by an activated sludge process or by means of a trickling filter, the wastewater is purified by the actions of microorganisms.

Removal of phosphorus from wastewater is essential in any wastewater treatment process, because high bio-available phosphorus in the water, if discharged into natural water streams, will cause many adverse effects on the environment. Generally, bio-available phosphorus (e.g. orthophosphate) is the limiting nutrient in freshwater aquatic systems. Increased concentration of available phosphorus allows plants to assimilate more nitrogen before the phosphorus is depleted. Thus, if sufficient phosphorus is available, elevated concentrations of nitrates will render the water eutrophic and lead to algal blooms. "Algal blooms" refers to generally to nutrient-induced production of aquatic plants in both freshwater and estuaries. Detrimental consequences of algal blooms include odors and discoloration caused by algal mats and decaying algal clumps, which will interfere with recreational and navigational water uses; oxygen depletion which interferes with aquatic fauna and in extreme cases can lead to death of desirable fish species, and disruption of the composition of native flora due to altered nutrient profiles.

Phosphorus reduction is now an active target by the EPA. In some states, every wastewater operation is required to monitor daily levels of phosphorus in their effluent. Additionally, some operations are already permitted for phosphorus reduction at levels from 0.3 mg/litter (ltr) to 1.0 mg/ltr, with 1.0 mg/ltr being the most typical.

The current accepted approach involves the addition of certain chemicals, with ferric chloride and alum being the most dominant choices in the industry. It is generally accepted that the addition of sufficient volumes of either of these chemicals will guarantee acceptable phosphorus reduction. Typically, commercial suppliers suggest that 200 mg/ltr of ferric chloride or alum as being sufficient for adequate phosphorus reduction, to meet permit requirements. For example, in the state of Minnesota, addition of ferric chloride or alum are a "process requirement" for obtaining permits for wastewater operations.

Chitosan has been used in water treatment in the pool and spa industry, as well as in treatment of storm water, but not in the wastewater industry. Like currently available chemicals such as ferric chloride and alum, the high cost of using chitosan has restricted its use. In addition to cost concerns, the high volumes of these material required to achieve acceptable results have resulted in increased sludge volume in wastewater treatment plants where they have been used.

Additionally, when alum is applied regularly, the resulting aluminum-containing sludge is known to inhibit microbial and other biological and biochemical processes that are required for activated sludge to degrade contaminants in the wastewater. Paradoxically, the use of ferric chloride and alum also causes a condition referred to as 'chemical dependency' by operational personnel in municipal wastewater operations. In other words, when chemicals such as ferric chloride or alum are used, the microbial population in a wastewater operation tend to become dependent upon the continued use of the chemicals in order to function efficiently.

Chemical additions are also a concern because of their corrosive qualities and the risk in handling them. These corrosive effects lead to decreased life expectancy of equipment and other physical structures of the wastewater treatment plant, increasing the cost of operation.

Therefore, there are needs for improved methods and compositions that solve these problems.

SUMMARY OF THE INVENTION

As a result of extensive research and testing, novel and much improved methods and compositions for wastewater treatment have been obtained that remove many of the prior concerns.

In one embodiment, this invention provides a composition for wastewater treatment, comprising a mixture of about 50-90% calcium carbonate ($CaCO_3$) and 10-50% magnesium carbonate ($MgCO_3$). Preferably, the composition comprises about 75% $CaCO_3$ and about 25% $MgCO_3$. More preferably, the composition is a mixture of fine powders of $CaCO_3$ and $MgCO_3$.

In another embodiment, the composition of the invention further comprise water, chitosan and acetic acid. Advantageously, a composition of the present invention comprises about 1-2 parts by weight chitosan, 1-2 parts by weight of a mixture of fine powders of $CaCO_3$ and $MgCO_3$ in a 3:1 ratio, 1-2 parts by weight of glacial acetic acid, and 100 parts by weight of water.

The present invention further provides a method for making the above inventive composition, which method comprises dissolving 1-2 parts by weight of chitosan in 100 parts by weight of water, adding 1-2 parts by weight of a mixture of fine powders of $CaCO_3$ and $MgCO_3$ in a 3:1 ratio, and adding 1-2 parts by weight of acetic acid.

In still another embodiment, the present invention provides a composition which comprises comprising a lanthanum salt and a mixture of fine powders of $CaCO_3$ and $MgCO_3$, which preferably is in a 3:1 ratio. Preferably, the lanthanum salt is lanthanum chloride. In a specific embodiment, the composition comprises about 36% to about 60% by weight of lanthanum chloride, and about 7% by weight of a composition comprising a mixture of fine powders of $CaCO_3$ and $MgCO_3$ at a ratio of about 3:1.

Still further provided is a method for preparing the above composition, which method comprises by adding lanthanum chloride to a mixing tank filled with water in volume of about 36% to about 60% by weight, along with about 7% by weight of a mixture of fine powders of $CaCO_3$ and $MgCO_3$ in a 3:1 ratio, and mixing for at least about 2 hours to achieve complete solubility and stabilization.

The present invention also provides a method for treating wastewater, the method comprising adding a composition of the present invention to the wastewater. Preferably, the composition is added at an amount of about 2-30 parts per million parts of wastewater to be treated. The various compositions described above may be added alone or in a suitable combination with each other, and may be added any stage of a water treatment process, preferably during at least one of the steps of preliminary treatment, aeration, primary settling, final settling and dewatering. The composition may also be added during at least two of the steps of preliminary treatment, aeration, primary settling, final settling and dewatering.

Preferably, the method of wastewater treatment of the present invention comprises (1) adding a first composition comprising a mixture of about 50-90% calcium carbonate ($CaCO_3$) and 10-50% magnesium carbonate ($MgCO_3$) to the wastewater to be treated, and (2) adding a second composition comprising chitosan to the wastewater to be treated. Preferably, the second composition comprises about 1-2 parts by weight of chitosan by weight, 1-2 parts by weight of a mixture of fine powders of calcium carbonate and magnesium carbonate in the ratio of about 3-1, 100 parts by weight of water, and 1-2 parts by weight of glacial acetic acid. Still more preferably, the first composition is added during at least one of the steps of preliminary treatment, aeration, primary settling, final settling and dewatering, and the second composition is added during at least one of the steps of preliminary treatment, aeration, primary settling, final settling and dewatering. Still more preferably, the first composition is added during at least two of the steps of preliminary treatment, aeration, primary settling, final settling and dewatering; and the second composition is added during at least two of the steps of preliminary treatment, aeration, primary settling, final settling and dewatering.

In yet another embodiment, the present invention provides a method for treating wastewater, the method comprising (1) adding a first composition comprising a mixture of about 50-90% calcium carbonate ($CaCO_3$) and 10-50% magnesium carbonate ($MgCO_3$) to the wastewater to be treated, and (2) adding a second composition comprising lanthanum choloride to the wastewater to be treated. Preferably, the second composition comprises about 36% to about 60% by weight of lanthanum chloride, and about 7% by weight of a mixture of fine powders of calcium carbonate and magnesium carbonate in the ratio of about 3-1. Still more preferably, depending on the characteristics of the wastewater under treatment, first composition is added during at least one of the steps of preliminary treatment, aeration, primary settling, final settling and dewatering, and the second composition is added during at least one of the steps of preliminary treatment, aeration, primary settling, final settling and dewatering.

Further provided in the present disclosure is a method for treating wastewater, the method comprising (1) adding a first composition comprising a mixture of about 50-90% calcium carbonate ($CaCO_3$) and 10-50% magnesium carbonate ($MgCO_3$) to the wastewater to be treated, (2) adding a second composition comprising chitosan to the wastewater to be treated, and (3) adding a third composition comprising lanthanum chloride to the wastewater to be treated. Preferably, the second composition comprises about 1-2 parts by weight of chitosan by weight, about 1-2 parts by weight of a mixture of fine powders of calcium carbonate and magnesium carbonate in the ratio of about 3-1, 100 parts by weight of water, and about 1-2 parts by weight of acetic acid.

In a preferred embodiment, the third composition comprises about 36% to about 60% by weight of lanthanum chloride, and about 7% by weight of a mixture of fine powders of calcium carbonate and magnesium carbonate in the ratio of about 3-1. Still more preferably, the first composition is added during at least one of the steps of preliminary treatment, aeration, primary settling, final settling and dewatering, the second composition is added during at least one of the steps of preliminary treatment, aeration, primary settling, final settling and dewatering; and the third composition is added during at least one of the steps of preliminary treatment, aeration, primary settling, final settling and dewatering.

In another embodiment, the first composition is added during at least two of the steps of preliminary treatment, aeration, primary settling, final settling and dewatering, and/or the second composition is added during at least two of the steps of preliminary treatment, aeration, primary settling, final settling and dewatering; and/or the third composition is added during at least two of the steps of preliminary treatment, aeration, primary settling, final settling and dewatering.

DETAILED DESCRIPTION OF THE INVENTION

The Wastewater Treatment Process

Wastewater, such as municipal sewage is the liquid waste from homes, businesses, and industries, and contains water, and impurities. The impurities can be categorized approximately into the following groups: (1) Grit (sand and gravel) and debris; (2) particulate organic matter (POM), which generally contains organic particles of various sizes and microorganisms; (3) colloidal and dissolved organic matter (DOM); and (4) colloidal and dissolved inorganic material (DIM) such as ammonia, nitrate, and phosphate. Toxins, heavy metals, pesticides, and other uncommon components fall into the above categories.

Both POM and DOM contribute to the biological oxygen demand (BOD), defined as the amount of oxygen required to oxidize all organic matter to $CO_2$ and $H_2O$, and is a measure of the amount of organic matter present in the wastewater. An important component of the POM is microorganisms many of which are pathogens.

For ecological and public health reasons, wastewater must be treated to remove the impurities before it is released into a natural water body, such as river, lake, or ocean (receiving water).

Generally, inexpensive physicochemical (e.g. settling and coagulation) and biological processes are used to treat wastewater. These treatment can be divided into several levels, which are pre-treatment; primary treatment; secondary treatment; tertiary treatment and post-treatment.

The process starts with pretreatment, which involves the removal of grit and large debris and particles for example by a combination of parallel bars and grid filters, through which water flows. Debris trapped on screen is removed and sent to landfill or incinerated. The wastewater stream then enters a grit settling chamber, where the flow velocity is reduced slightly so that sand and gravel settle, and the settled solids are removed and sent to landfill.

The primary treatment, sometimes also known as primary settling, removes particulate organic material (POM), also by settling. This occurs in primary clarifiers with low flow velocity. Particles settle to the bottom, forming raw sludge which is periodically removed and sent to sludge treatment facility (see below). Clarified water flows over the sides of the primary clarifiers and is sent to secondary treatment. Grease and fat are skimmed off the top and disposed of via e.g. incineration.

Dissolved organic material are primarily removed in secondary treatment, which is largely a biological process involving microbial metabolisms. Several technologies exist for secondary treatment. For example, trickling filters, one of the oldest methods, utilizes large tanks filled with a substrate e.g. rocks or a synthetic material, that provides abundant surface area exposed to air, which supplies oxygen necessary for microbial metabolism of the organic matter. Supernatant from primary clarifiers is applied to the media and allowed to flow over its surfaces, where bacteria growing on the surfaces coverts the DOM into carbon dioxide and biomass.

A relatively new secondary treatment process uses rotating biological contactor, which is a specialized type of trickling filter, where supernatant flows over large rotating disks. The disks increase surface area, and the bacteria grow in thick layers on the disks.

More commonly, activated sludge is used for secondary treatment. This process is more complex, more expensive, but is more effective and requires less space. Generally, a large tank ("aeration tank") is used, through which clarified sewage flows. Clarified wastewater enters at one end, is inoculated with aerobic bacteria (from sludge), and vigorously aerated. Bacteria assimilate DOM and reproduce rapidly, converting the DOM to POM, $CO_2$ and $H_2O$. Effluent is sent to secondary clarifier ("final settling") to remove sludge (POM), which is "activated" sludge and sent to the sludge treatment facility. Some of the activated sludge is used, or wasted back, to inoculate the incoming supernatant. Supernatant from the secondary clarifier goes to tertiary treatment or post-treatment.

Post-treatment aims to disinfect, increase dissolved oxygen, and improve appearance, via various techniques, such as chlorination, ozone treatment, ultraviolet irradiation, filtration, and aeration.

Solid waste from the wastewater are removed at several steps in the process, in the form of raw sludge or activated sludge, must also be treated before they can be disposed of. These treatments will disinfect, reduce BOD, reduce order, and reduce its water content, weight and volume. Raw sludge comes from primary and secondary clarifiers, contains a large amount of water and must be dewatered in a sludge thickener (also known as a sludge clarifier), where particulates are allowed to settle and water is decanted to influent (sent back to beginning). Polymers are used for assist in the thickening and dewatering process. Solids are treated by various technologies, such as anaerobic digestion (often in a container referred to as a primary digester), land application of liquid sludge, composting, and co-composting. The anaerobic digestion process often produces methane and other gases that can be used to fuel boilers and heating facilities on the water treatment premise.

The term "tertiary treatment," as used herein, refers to the processes for the removal of dissolved inorganic nutrients (DIM), especially phosphorus. It is not a single process, but can occur at various stages of the wastewater treatment process. A combination of chemical, physical, and/or biological mechanisms are involved. It is necessary to prevent eutrophication of receiving water.

As mentioned above, prior art methods usually use chemicals to precipitate or coagulate phosphorus compounds, which are settled, separated, disposed of as part of the sludge and eventually sent to landfill.

As a result of extensive research and testing, novel and much improved methods and compositions for wastewater treatment have been obtained that remove many of the prior concerns.

The methods and compositions of the present invention utilize significantly less chemicals and achieve greater efficiency, thus providing significant cost savings in wastewater treatment operations. Tests in more than 20 wastewater plants showed that the treatment cost using methods and composition of this invention were at least 50% less than the use of prior art chemical additions.

The methods and compositions of the present invention can be used in a wastewater operation without the biological components of the wastewater treatment systems becoming dependent upon its use. In cases where its use has been discontinued, the wastewater plants have had no shock from its withdrawal, continuing to operate at high efficiency.

In addition, methods and compositions of the present invention reduce the need for sludge dewatering. Where methods and compositions of the present invention are used, significant dewatering is achieved during the treatment process, because the flocculation process occurs at a higher efficiency, and continues when the sludge is dried. As a consequence, if the methods of the present invention is used, less polymer is required, compared to a process without using the methods and compositions of the present invention, to achieve the desired level of sludge dryness.

Activated sludge produced by a wastewater treatment process according to the present invention is capable of continued performance as long as it remains in the treatment system. When the activated sludge is "wasted back" through the wastewater treatment process, the chemicals contained in the sludge are reactivated and continue to function, increasing the level of performance of the treatment process. Generally, after a 30-day period of continued use of the compositions of the invention and wasting back of the activated sludge, the amount of treatment compositions needed to be added can be significantly reduced.

Wastewater treatment processes according to the present invention further achieves "sludge conditioning," that is, the chemicals added according to the present invention become integrated in the sludge inventory and continue to work actively when the sludge is aerated or mixed, resulting in sludge that is conditioned by its presence. This results in a healthier environment which is less affected by the shock of toxins, high levels of chemicals or grease and fats.

Compositions of the Invention

Three discrete compositions are provided according to the present invention and a detailed description of each is provided below. These three compositions are referred to as Component I, Component II and Component III, respectively, which can be used alone in a wastewater treatment process, or as a mixture with appropriate mixing ratio. The suitable mixing ratio depends on the characteristic of the wastewater to be treated which in turn depends on the location and source of the wastewater, and many other factors. The mixing ratio can be determined by conducting a one-liter bench settlement test and can be routinely performed by those ordinarily skilled in the art.

According to one embodiment of the present invention, Component I comprises a mixture of $CaCO_3$ and $MgCO_3$. The mixture preferably comprises about 50-90% $CaCO_3$ and about 10-50% $MgCO_3$. Preferably, the mixture comprises about 75% $CaCO_3$ and about 25% $MgCO_3$.

Component I can be prepared by blending a fine powder of calcium carbonate and a fine powder of magnesium carbonate in a large, commercial dry-mixer until complete integration is achieved. This process normally takes an hour to accomplish.

Component II of the present invention comprises Component I, Chitosan, and acetic acid. Preferably, Component II is prepared by adding, in 100 parts of water, preferably deionized water, about 1-2 parts (by weight) of chitosan, and about 1-2 parts (by weight) of Component I, described above. After integrating the chitosan solution completely into the water by stirring, about 1-2 parts (by weight) of glacial acetic acid is added at an equal volume by weight. This solution is stirred or mixed for about 8 hours to achieve complete solubility and stabilization.

Component III of the present invention comprises a mixture of Component I and lanthanum chloride in water. Preferably, Component III comprises about 36-60% by weight of lanthanum chloride and 7% by weight of Component I described above. In a preferable embodiment, Component I is prepared by adding 36% to about 60% parts by weight lanthanum chloride, along with about 7% by weight of Component I, to a mixing tank filled with an appropriate volume of water. This solution is preferably mixed for at least about 2 hours to achieve complete solubility and stabilization, and the final volume of the solution is brought to 100 parts by weight.

Treatment Methods

The present invention further provides a method for improving efficiency of wastewater treatment, the method comprising applying an effective amount of at least one composition selected from the group consisting of Component I, Component II, and Component III in a wastewater treatment process.

In one embodiment, Component I is used alone, and is preferably applied at or near the head-works of the wastewater treatment plant.

When either of Component II or Component III is used alone, they may be applied at any point of the treatment process, but preferably at or near the head-works of the Plant.

Preferably, all three Components are applied, either in combination or separately, during the treatment process. Preferably, they are applied together at the same time.

The compositions of the present invention may be applied to a wastewater treatment process at any one of the many treatment stages described above. Preferably, they are applied, as a mixture of appropriate proportions to each other, at the primary settling stage, immediately after pre-treatment. Because the wastewater streams are generally already fairly turbulent, there is no need to employ means to mix the treatment chemicals to the wastewater to be treated.

In a typical wastewater operation, about 2-30 ppm (parts per million of wastewater to be treated) of a composition of the present invention are applied to achieve acceptable treatment results. As discussed above, the compositions of the present invention may be added to the wastewater at one or more suitable stages alone, or in any combination. Preferably, the mixture comprises between 50-80% by weight of Component I, 10-35% by weight of Component II, and 10-35% by weight of Component III.

In Operations where sludge is returned for further treatment, a suitable mixture of the compositions of the invention can be 'batch-fed' at or near the front of the plant, such as at the headworks. Immediately upon addition, the mixture will act on the wastewater to begin the flocculation process, resulting in faster settlement of the sludge and clearer supernatant compared to methods of in the prior art. The sludge that is wasted to the digesters tends to settle more, allowing for greater decanting from the digesters, increased thickening, and reduced demand for polymer to dry the sludge. The sludge that is wasted back through the plant for further treatment will function to assist the flocculation process, even though the floc has been sheared.

As discussed above, in prior art wastewater treatment operations, chemicals such as polymer, ferric chloride or alum have been utilized to facilitate flocculation. Although the results have been somewhat satisfactory, these practices created risks such as of toxicity, corrosion and "chemical dependency." Utilizing the compositions of the present invention in a process for wastewater treatment, the use of chemical flocculants such as polymers, ferric chloride or alum may be eliminated or at least significantly reduced, thus removing the risks of introduced-toxicity or corrosion or chemical dependency. In addition, the compositions of the present invention, especially Component I, has significant "residual benefit" because it will re-floc after being returned from clarification to the head of the plant or to aeration. Furthermore, there is no chemical dependency and a wastewater treatment facility can stop using Component I without any adverse effects on the biological population.

For example, historically, the addition of alum has been necessary for flocculation in potable water operations. Tests showed that Component I of the present invention, when used alone, is as effective as an equal amount of alum in potable water treatment. When Component I is used in combination of Component II, only one half by weight of the Components I and II mixture is required to achieve equivalent results.

In addition, tests done in three different potable wastewater treatment plants (located in Knoxville, Tenn.; Whitesburg, Ky.; and Kingston, Tenn., respectively] have shown that equivalent solids-removal results can be achieved using 40% less of Component II alone than alum.

Test Results Using Component I

Removal of solids and nutrients: Component I can be applied to wastewater at the headworks of a wastewater plant, i.e., prior to primary treatment, or following primary treatment, but prior to aeration. It will begin to floc when it is introduced, continues to floc throughout the operation until the sludge goes to the clarifier, where the sludge settles more than 100% faster and further than with chemical additions such as polymer, ferric chloride or alum. This has been proven in hundreds of lab tests on sludge in wastewater plants, as well as in actual application in more than 50 activated sludge wastewater plants. In actual wastewater operations, the results in settling have averaged over 100% improvement in sludge depth of the clarifiers, BOD and TSS reduction of more than 100%, and removal of soluble metals, etc. Furthermore, when the sludge from the clarifier is "wasted back" to the head of the plant, the sludge retains its flocculating ability and will begin flocculating again. Even if the floc is sheared, it will floc back again. In lab tests, a sample can be allowed to settle, re-agitated, and it will settle better after re-agitation. When Component I is withdrawn, the results begin to decrease after about one week, and continue to decrease until there is no obvious effect after 20 days.

Tests show a dramatic decrease in BOD, TSS, odor, and soluble contaminants. In addition, Component I, when used in combination with Components II or III, or ferric chloride or alum, achieves adjustment of the pH of the wastewater treated, to or near neutral. Specifically, a preferred embodiment of Component I, which comprises about 75% by weight $CaCO_3$ and 25% by weight $MgCO_3$ (hereinafter referred to as BC2) was tested on the removal of dyes, phosphorus, zinc, copper, molybdenum, and other solubles with exceptional results. Over 90% removal of dyes have been accomplished in textile mills around the Dalton, Ga. area. Tests revealed more than 50% reduction in the need for chemicals such as ferric chloride or alum in Minnesota, and more than 80% reduction in these chemicals in Florida. Efforts in removal of zinc, molybdenum and copper have achieved levels below 0.5 mg/ltr. In addition, in Seminole County, Florida, Components I and III were used to address their phosphorus problem. With phosphorus level at 20 ppm in the influent, and a 0.6 ppm target at the effluent, it was determined that about 300 gallons of ferric chloride were necessary to treat 400,000 gallons per day effectively. This is the equivalent of 750 gallons to treat one million gallons of water. Using BC2, only 60 gallons of ferric chloride per day were used to achieve 0.3 ppm of phosphorus in their effluent.

Reduction of polymer needed for sludge drying: Prior to the present invention, polymers are routinely added during the sludge drying step of the treatment process to achieve sludge drying. Tests revealed that when Component I of the present invention is used, the amount of polymer is reduced, whether a press or other conventional method is used. In general, 50% reduction of polymer is achieved, with 95% reduction being achieved at a Smurfit-Stone facility in south Alabama.

Test Results Using Component II

Elimination of Chemical Additions: In potable wastewater treatment plants, Component II can be used in place of alum in a flocculating tank, with or without additional use of Component I. Tests revealed a 60% or greater removal of solids/sediment in a potable water operation when equal volumes of Component II are used in place of alum. The sludge which is created by the use of alum is difficult to deal with, because alum sludge is typically either disposed of at a land fill or treated at the city's wastewater plant. If treated at the wastewater plant, it has undesirable effects such as rendering the biological population to become less active, causing the plant to be less efficient. In contrast, the Component II sludge has no such attributes, and can be safely dealt with and even treated in the city wastewater plant as though there had been no treatment addition at the potable water plant.

In wastewater operations, Component II can be used in place of polymer, ferric chloride or alum to achieve flocculation and removal of solids. When used as a 'stand-alone' addition, over 50% greater efficiency is achieved in comparison with chemical additions (i.e. the use of alum or ferric chloride).

The present invention further provides methods that uses both Components I and II in the treatment of waste water. Tests reveal over 70% greater efficiency than chemical additions when Component I is used in conjunction with Component II, without the risk of toxicity, corrosion or chemical dependency.

Unlike synthetic polymers, Component II continues to function as a flocculent even if the floc is sheared. In addition, due to its significant flocculation capabilities, it can be used in ponds, lagoons, or amusement parks to flocculate solids. Used alone, it creates a buoyant floc that can be filtered out of the water safely, without any hazardous handling characteristics.

Test Results Using Component III

The present invention further provides Component III, primarily for using in combination with Component I. Component III in one embodiment comprises an aqueous solution of lanthanum chloride. Lanthanum is able to flocculate phosphorus compounds which is then settled by gravity or filtered or otherwise removed. It is believed that stoichimetrically, lanthanum acts on orthophates on a 1-to-1 basis. In comparative testing on activated sludge wastewater with ferric chloride, alum and Component III, equivalent results were achieved using Component III at an amount that is 65% or less of the amount of ferric chloride, or 70% or less of alum.

Tests show that a mixture of Component III/BC2, at a ratio of 35-30:65-70 by weight, reduced phosphorus levels to 1.0 mg/ltr (ppm). In order to achieve similar results, twice as much in terms of weight of ferric chloride or alum would be required. Equal samples of water drawn from municipal wastewater plants in Tennessee, Georgia and Minnesota, were treated to remove phosphorus using ferric chloride, alum, Component III alone, and Component III/BC2 combination. Results showed consistent differences in the water drawn from each location. Specifically, water drawn from Georgia had a phosphorus level of 7.2 ppm, and the target was 0.1 ppm. This target was achieved with 65% as much Component III as ferric chloride and 70% as much Component III as Alum. When Component III was used with BC2, the target of 0.1 ppm was achieved with 50% less BC2 and Component III mixture as ferric chloride or alum. The water drawn from Tennessee showed a phosphorus level of 5.6 ppm. The results were consistent with the results achieved with the Georgia water. The water drawn from Minnesota showed a phosphorus level of 7.5 ppm, and The results were consistent with the tests in Georgia and Tennessee.

Similar results were obtained using a mixture of BC2, Component II and Component III of the present invention at a ratio of about 51:17:31% by weight.

In accordance with another embodiment of the present invention, Component III is applied directly to a natural water body (ponds, lagoons) or water from amusement parks to reduce its phosphorus content. In ponds and lagoons, acceptable levels of phosphorus reduction (1.0 mg/ltr) were achieved using Component III at 60% of ferric chloride and alum additions for similar treatments.

Results from tests with water from an aerated lagoon in Commerce, Ga. showed that, compared to alum, only about 40% in weight of Component III was needed to achieve similar results. In Savannah, Ga., a 50% reduction in amount of chemicals needed for treatment to reduce phosphorus level and eliminate aquatic growth/algae bloom. In Clearwater, Minn., test results showed a 42% decrease in the need for treatment (by weight) using Component III instead of alum. In each experimental case, the testing was done in 1,000 ml beakers with equal amounts of water drawn from the same source at exactly the same time. Addition of each additive was done with a dropper at equal amounts until the target of phosphorus level of 0.1 ppm was achieved.

Combination of Components II and III

When Components II and III are used in combination, more efficiency is achieved than when used alone. In 73% of tests utilizing Components II and III in combination, flocculation took place more quickly than when they are used alone. These tests were done with samples drawn from municipal wastewater plants in North Georgia and in Tennessee. These tests showed greater clarity in the supernatant and 11% greater compaction in the sludge blanket after 30 minutes.

EXAMPLES

Example 1

The location of this test is a treatment facility at Athens, Tenn. The wastewater entered the treatment plant through the influent mixing point and was mixed with returning sludge pumped from the bottom of final clarifiers (settling tanks). Traditionally, polymer was added at this point to coagulate the organic matter. At the aeration basins, the water was mixed with surface aerators to mix air into the water to support bacteria which start the digestion process of the sludge. The water was drawn from the top at the opposite end of the aeration basins through spillways and pumped to the clarifiers (settling tanks). At the clarifiers (settling tanks), the water from the aeration basins were pumped into the settling tanks and polymer was added to concentrate any remaining material. Suspended particles settled to the bottom and were removed by scrapers. The sludge was pumped from the bottom to the digesters or back to the influent mixing point for further treatment. The clear water at the surface flew over a 'weir' to the clorination chamber for chlorine addition, where clorine was added for disinfection. The water was then released to the receiving stream. Some of the sludge that settled to the bottom of the clarifiers was pumped into a digester where anaerobic bacteria consume some of the organic waste. The sludge was pumped from the digesters to the belt press where polymer was added to concentrate the sludge. This process is called 'de-watering.' The water that was removed in this process is pumped back to the front of the facility for further treatment.

Without the use of BC2, total polymer usage averaged 67 ppm for satisfactory results.

With a process identical to the above, a mixture of BC2, Components II and III (82:9:9%) were added at the influent mixing point (#1) at the rate of 3.4 ppm. For achieving a similarly satisfactory result, the need to add polymer at the influent mixing point or in the aeration basins was eliminated, and the polymer usage at the belt press was reduced to only 20 ppm.

Example 2

The location of this test is a treatment facility at Calhoun, Ga. At the influent mixing point, the wastewater entered the plant and was mixed with returning sludge pumped from the bottom of Final Clarifiers (Settling tanks). Prior to the use of BC2 of the present invention, a deodorizer was sprayed into the air on each corner of the facility to cover the malodors. At the aeration basins, the water was mixed by "Orbital Contacters" (aerators) to mix air into the water to support bacteria which start the digestion process of the sludge. The water was drawn from the top of the aeration basins through spillways and pumped to the Clarifiers (Settling tanks). In the clarifiers (settling tanks), water from the Aeration Basins were pumped into the settling tanks. Traditionally, Polymer was added at this point to coagulate (draw together) the organic matter. Suspended particles settled to the bottom and were removed by scrapers. The sludge was pumped from the bottom to the Digesters or back to the Influent mixing point for further treatment. The clear water at the surface flew over a 'weir' to the Clorination Chamber for chlorine addition and disinfection, prior to being released to the receiving stream. Prior to the application of BC2, a de-foamer was needed to stop foam from entering the receiving stream. At the digesters, parts of the sludge that settled to the bottom of the Clarifiers was pumped into the Digesters where bacteria consume some of the organic waste. At the belt press, the sludge was pumped from the Digesters to the Belt Press where Polymer was added to concentrate the sludge. The water removed in this process is pumped back to the Influent mixing point for further treatment.

The total polymer usage for the above process averaged 89 ppm before the application of compositions of the present invention, the total defoamer usage averaged 4.5 ppm, and the total deodorizer usage averaged 16 ppm.

As a comparison, a mixture of BC2, Component II and Component III (in a ratio of 70/22/8) was applied at the influent mixing point (#1) at the rate of 3 ppm. The treatment process otherwise remained identical. For achieving similar results, the application of the mixture of the present invention eliminated the need to add polymer into the settling tanks, decreased the defoamer usage average to 0.1 ppm, eliminated the use of deodorizer, and decreased the polymer usage at the Belt Press to 29 ppm.

Example 3

The location of this test is a treatment facility at Morristown, Minn. At the influent mixing point, the wastewater enters the Plant through the influent and was mixed with returning sludge pumped from the bottom of Final Clarifiers (Settling tanks). At the aeration basins, the water was mixed by "extended air" (aerators) to mix air into the water to support bacteria which start the digestion process of the sludge. The water was drawn from the top of the aeration basins through spillways and pumped to the Clarifiers (Settling tanks). At the clarifiers (Settling tanks), water from the Aeration Basins were pumped into the settling tanks where a polymer was added at 70 ppm prior to the addition of compositions of the present invention, for reducing phosphorus. Suspended particles settled to the bottom and were removed by scrapers. The sludge was pumped from the bottom to the Digesters or back to the Influent mixing point for further treatment. The clear water at the surface of the Clarifiers flows over the weir and is pumped into the Contact Chamber (Clorination Chamber) for chlorine addition in order to disinfect the water prior to release to the receiving stream. Some of the sludge that settled to the bottom of the Clarifiers was pumped into the Digesters where bacteria consumed some of the organic matter. The sludge was pumped from the Digesters to Drying Beds to drain dry (de-watering). The water that was removed in this process was pumped back to the front of the facility for further treatment.

As a comparison, BC2 alone was applied at the influent mixing point at the rate of 3.6 ppm during aeration (in the Aeration Basin). The treatment process otherwise remained identical. For achieving similar results, the application of the mixture of the present invention decreased the polymer addition to 30 ppm, added at the same point as before.

I claim:

1. A composition for wastewater treatment, comprising a mixture of about 50-90% by weight calcium carbonate ($CaCO_3$), 10-50% by weight magnesium carbonate ($MgCO_3$), and water, chitosan and acetic acid, in amounts effective in achieving flocculation and removal of solids in said wastewater treatment.

2. The composition according to claim 1, wherein the composition comprises about 75% by weight $CaCO_3$ and about 25% by weight $MgCO_3$.

3. The composition according to claim 2, wherein the composition includes a mixture of fine powders of $CaCO_3$ and $MgCO_3$.

4. A composition according to claim 3 which comprises about 1-2 parts by weight chitosan, 1-2 parts by weight of $CaCO_3$ and $MgCO_3$, 1-2 parts by weight of glacial acetic acid, and 100 parts by weight of water.

5. A composition according to claim 4, which is prepared by dissolving 1-2 parts by weight of chitosan in 100 parts by weight of water, adding 1-2 parts by weight of $CaCO_3$ and $MgCO_3$, and adding 1-2 parts by weight of acetic acid.

6. The composition of claim 1, further comprising a lanthanum salt.

7. The composition of claim 6, wherein the lanthanum salt is lanthanum chloride.

8. The composition of claim 7, comprising about 36% to about 60% by weight of lanthanum chloride, and about 7% by weight of a composition comprising a mixture of fine powders of $CaCO_3$ and $MgCO_3$ at a ratio of about 75:25.

9. A composition prepared by adding lanthanum chloride to a mixing tank filled with water in volume of about 36% to about 60% by weight, along with about 7% by weight of $CaCO_3$ and $MgCO_3$, and mixing mixed for at least about 2 hours to achieve complete solubility and stabilization, wherein said composition is effective to achieve flocculation of phosphorus compounds in wastewater.

10. A composition for wastewater treatment, comprising a mixture of about 50-90% by weight calcium carbonate ($CaCO_3$), 10-50% by weight magnesium carbonate ($MgCO_3$) and a lanthanum salt, to achieve flocculation of phosphorus compounds in said wastewater treatment.

* * * * *